United States Patent
Mitsui et al.

(10) Patent No.: US 9,327,236 B2
(45) Date of Patent: May 3, 2016

(54) WET TYPE FLUE-GAS DESULFURIZATION METHOD

(71) Applicant: Mitsubishi Hitachi Power Systems, Ltd., Yokohama-shi, Kanagawa (JP)

(72) Inventors: Yoshiaki Mitsui, Kure (JP); Hiroshi Ishizaka, Kure (JP); Naruhito Omine, Kure (JP); Atsushi Katagawa, Kure (JP); Ryota Ochiai, Kure (JP)

(73) Assignee: Mitsubishi Hitachi Power Systems, Ltd., Yokohama-shi (JP)

( * ) Notice: Subject to any disclaimer, the term of this patent is extended or adjusted under 35 U.S.C. 154(b) by 0 days.

(21) Appl. No.: 14/638,801

(22) Filed: Mar. 4, 2015

(65) Prior Publication Data

US 2015/0174526 A1    Jun. 25, 2015

Related U.S. Application Data

(63) Continuation of application No. 13/571,959, filed on Aug. 10, 2012.

(30) Foreign Application Priority Data

Aug. 12, 2011   (JP) .................. 2011-176962

(51) Int. Cl.
*B01D 53/50* (2006.01)
*B01D 53/64* (2006.01)
(Continued)

(52) U.S. Cl.
CPC .............. *B01D 53/78* (2013.01); *B01D 53/504* (2013.01); *B01D 53/64* (2013.01); *B01D 53/75* (2013.01);
(Continued)

(58) Field of Classification Search
CPC ................. B01D 2251/404; B01D 2251/606; B01D 2257/2045; B01D 2257/602; B01D 53/14; B01D 53/48; B01D 53/504; B01D 53/64; B01D 53/75; B01D 53/78; F23J 15/02; F23J 2215/20; F23J 2215/60; F23J 2219/40; F23J 2900/15041
See application file for complete search history.

(56) References Cited

U.S. PATENT DOCUMENTS

| 5,429,808 A * | 7/1995 | Kuroda et al. ............... 422/176 |
| 2004/0202596 A1 | 10/2004 | Honjo et al. |
| 2011/0300043 A1 | 12/2011 | Sano et al. |

FOREIGN PATENT DOCUMENTS

| DE | 10 2009 017 937 A1 | 10/2010 | |
| DE | 102009017937 A1 * | 10/2010 | ............... F01N 3/04 |

(Continued)

OTHER PUBLICATIONS

Translation of DE 10 2009 017 937 retrieved Sep. 6, 2014.*
DE 10 2009 017 937 A1 translation retrieved Sep. 6, 2014.

*Primary Examiner* — Duane Smith
*Assistant Examiner* — Cabrena Holecek
(74) *Attorney, Agent, or Firm* — Crowell & Moring LLP

(57) ABSTRACT

A wet type flue-gas desulfurization apparatus, into which exhaust gas containing mercury goes, includes an upstream absorption tower, an upstream absorbent spray nozzle and a make-up water supply unit on an upstream side of a desulfurization apparatus body in a flow direction of the gas. The upstream absorption tower has a circulation tank reserving absorbent slurry. The make-up water supply unit supplies make-up water into the circulation tank to keep the chloride ion concentration of the absorbent in the circulation tank not lower than 50,000 ppm. Thus, it is possible to provide a wet type flue-gas desulfurization apparatus by which Hg can be prevented from being released again from the desulfurization apparatus, the purity of recovered gypsum can be increased and the usage of industrial water can be reduced.

4 Claims, 6 Drawing Sheets

(51) Int. Cl.
  *B01D 53/78* (2006.01)
  *B01D 53/75* (2006.01)
  *F23J 15/02* (2006.01)

(52) U.S. Cl.
  CPC ............ *F23J 15/02* (2013.01); *B01D 2251/404* (2013.01); *B01D 2251/606* (2013.01); *B01D 2257/2045* (2013.01); *B01D 2257/2047* (2013.01); *B01D 2257/602* (2013.01); *F23J 2215/20* (2013.01); *F23J 2215/60* (2013.01); *F23J 2219/40* (2013.01); *F23J 2900/15041* (2013.01)

(56) References Cited

FOREIGN PATENT DOCUMENTS

| | | |
|---|---|---|
| JP | 5-337331 A | 12/1993 |
| JP | 7-275648 A | 10/1995 |
| JP | 10-5538 A | 1/1998 |
| JP | 10-216476 A | 8/1998 |
| JP | 2004-313833 A | 11/2004 |
| JP | 2005-125261 A | 5/2005 |
| JP | 2006-136856 A | 6/2006 |
| JP | 2010-207761 A | 9/2010 |
| JP | 2010-269277 A | 12/2010 |

* cited by examiner

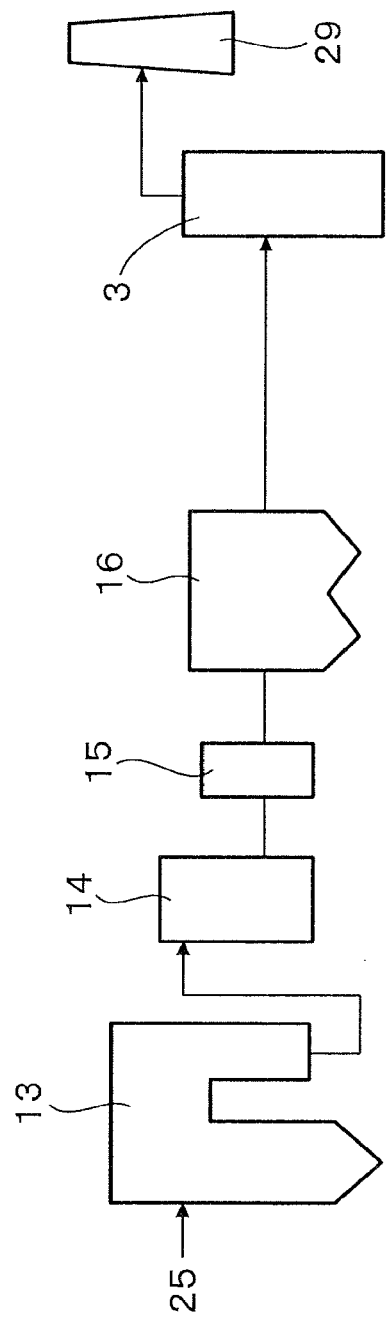

WET TYPE FLUE-GAS DESULFURIZATION METHOD

CROSS REFERENCE TO RELATED APPLICATIONS

This application is a continuation of U.S. application Ser. No. 13/571,959, filed Aug. 10, 2012, which claims priority from Japanese Patent Application No. 2011-176962, filed on Aug. 12, 2011, the disclosures of which are expressly incorporated by reference herein.

BACKGROUND OF THE INVENTION

1. Field of the Invention

The present invention relates to a wet type flue-gas desulfurization apparatus mainly used in a thermal power plant or the like. Particularly, it relates to a wet type flue-gas desulfurization apparatus (hereinafter referred to as desulfurization apparatus) provided with an absorption tower for eliminating sulfur oxide (SOx), mercury (Hg), etc. contained in gas to be treated, such as exhaust gas.

2. Description of the Background Art

In order to prevent air pollution, wet type limestone-gypsum process desulfurization apparatuses have been put into practice broadly as apparatuses for eliminating SOx and so on from exhaust gas discharged from combustion equipment such as boiler apparatuses installed in factories, steel mills, chemical plants, thermal power plants, etc.

FIG. 6 is a schematic configuration diagram of a boiler plant for thermal power generation, which uses coal as fuel.

As shown in FIG. 6, this type boiler plant for thermal power generation is chiefly constituted by a boiler apparatus 13, a denitration apparatus 14, an air preheater 15, an electrical precipitation apparatus 16, a desulfurization apparatus 3, etc.

The boiler apparatus 13 combusts coal 25 to generate exhaust gas. The denitration apparatus 14 breaks down nitrogen oxide (NOx) contained in the exhaust gas discharged from the boiler apparatus 13.

The temperature of the gas treated by the denitration apparatus 14 is adjusted to 160 to 200° C. by the air preheater 15, and ash dust is eliminated from the exhaust gas by the electrical precipitation apparatus 16. From the de-dusted exhaust gas, SOx and so on are eliminated by the desulfurization apparatus 3, and released into the atmosphere through a stack 29.

FIG. 5 is a schematic configuration diagram of a desulfurization apparatus 3 according to the background art.

As shown in FIG. 5, the desulfurization apparatus 3 is chiefly constituted by an absorbent spray nozzle 4, an absorbent circulation pump 5, a mist eliminator 8, an oxidation gas supply portion 9, an agitator 10, etc.

An absorbent 6 composed of limestone slurry and sprayed from the absorbent spray nozzle 4 is brought into gas-liquid contact with exhaust gas 1. Thus, SOx such as $SO_2$ is absorbed and eliminated together with ash dust or acid gas such as hydrogen chloride (HCl), hydrogen fluoride (HF), etc. in the exhaust gas 1.

The absorbed $SO_2$ becomes sulfurous acid. When the concentration of sulfurous acid is high, the efficiency in absorbing $SO_2$ is lowered. Therefore, oxidation gas 27 such as the air is supplied from the oxidation gas supply portion 9 so as to oxidize the sulfurous acid into gypsum. Thus, the performance to absorb $SO_2$ is resumed. The absorbent 6 containing gypsum is supplied to a not-shown dehydrator and extracted as gypsum from the desulfurization apparatus 3.

In FIG. 5, the reference numeral 2 represents exhaust gas in the outlet of the desulfurization apparatus; 11, an absorbent reservoir portion; and 26, a desulfurization absorption portion.

For example, JP-A-2010-269277, JP-A-5-337331, JP-A-2005-125261, JP-A-2006-136856, etc. have disclosed this type flue-gas treatment apparatus.

When Hg contained in flue gas of coal is eliminated by the desulfurization apparatus according to the background art, the Hg concentration in the absorbent 6 increases gradually. In the background art, there is no consideration about the point that absorbed Hg may be moved to the gypsum side. There is a problem that it is difficult to use recovered gypsum because the quality of gypsum deteriorates due to increase in Hg concentration on the gypsum side.

In addition, in the background art, there is no consideration about the point that Hg may be released again to the exhaust gas. There is a problem that the exhaust gas in the outlet cannot keep the regulation value of Hg.

Further, there is no consideration about the point that make-up water may be required due to the evaporation of the absorbent when the exhaust gas in the inlet of the desulfurization apparatus is cooled. In a region where industrial water is limited, fresh water generated from a desalination apparatus is used as the make-up water. There is a problem that the cost increases.

Examples of desalination methods include a multi-stage flash method, a membrane separation method, etc. In any method, concentrated water containing Cl ions of about 50,000 to 60,000 ppm is discharged in addition to desalted water with a lowered Cl-ion concentration. However, the Cl-ion concentrated water is often discharged directly to the sea because there is no place where the Cl-ion concentrated water can be used. The efficiency of the system as a whole can be further increased if the concentrated water can be used to save the water consumption of the desulfurization apparatus.

SUMMARY OF THE INVENTION

The present invention has been accomplished under such a background. An object of the invention is to provide a wet type flue-gas desulfurization apparatus and a thermal power plant having the same, by which Hg can be prevented from being released again from the desulfurization apparatus, the purity of recovered gypsum can be increased and the usage of industrial water can be reduced.

In order to attain the foregoing object, according to a first configuration of the invention, there is provided a wet type flue-gas desulfurization apparatus including: an absorption tower which has a circulation tank in a lower portion thereof, the circulation tank reserving absorbent slurry; an absorbent spray nozzle which is placed inside the absorption tower to spray the absorbent slurry such as limestone slurry; an oxidation gas supply portion which supplies oxidation gas to the absorbent slurry reserved in the circulation tank; and a desulfurization apparatus body which includes the absorption tower, the absorbent spray nozzle and the oxidation gas supply portion, and in which gas to be treated, containing sulfur compounds, is introduced into the absorption tower and brought into gas-liquid contact with the absorbent slurry sprayed from the absorbent spray nozzle, so that the sulfur compounds in the gas to be treated can be absorbed by the absorbent slurry; wherein: the gas to be treated contains mercury; and the desulfurization apparatus further includes: an upstream absorption tower which includes a circulation tank reserving absorbent slurry; an upstream absorbent spray nozzle which is placed inside the upstream absorption tower to spray the absorbent slurry; and a make-up water supply unit such as a seawater supply pump which supplies make-up water into the circulation tank to keep a chloride ion concentration of the absorbent in the circulation tank not lower than 50,000 ppm, the upstream absorption tower, the upstream absorbent spray nozzle and the make-up water supply unit being disposed on an upstream side of the desulfurization apparatus body in a flow direction of the gas to be treated.

According to a second configuration of the invention, there is provided a wet type flue-gas desulfurization apparatus according to the first configuration, wherein: the make-up water is seawater.

According to a third configuration of the invention, there is provided a wet type flue-gas desulfurization apparatus according to the first configuration, wherein: the make-up water is chloride-ion concentrated water obtained by a concentrated water manufacturing apparatus.

According to a fourth configuration of the invention, there is provided a wet type flue-gas desulfurization apparatus according to the third configuration, wherein: the concentrated water manufacturing apparatus is a desalination apparatus which obtains water from seawater so that the water obtained by the desalination apparatus can be used as washing water for gypsum obtained by reaction between the gas to be treated and the absorbent.

According to a fifth configuration of the invention, there is provided a wet type flue-gas desulfurization apparatus according to the first configuration, further including: an upstream mist eliminator which is provided between the upstream absorbent spray nozzle and the desulfurization apparatus body so that collected liquid obtained by the upstream mist eliminator can be returned to the upstream absorption tower.

According to a sixth configuration of the invention, there is provided a thermal power plant including: a boiler apparatus; and a wet type flue-gas desulfurization apparatus which eliminates sulfur compounds from exhaust gas discharged from the boiler apparatus; wherein: the wet type flue-gas desulfurization apparatus is a wet type flue-gas desulfurization apparatus according to any one of the first to fifth configurations.

According to a seventh configuration of the invention, there is provided a thermal power plant according to the sixth configuration, further including: a denitration apparatus which is provided on an upstream side of the wet type flue-gas desulfurization apparatus in a flow direction of the exhaust gas.

According to the invention configured as described above, it is possible to provide a wet type flue-gas desulfurization apparatus and a thermal power plant having the same, by which Hg can be prevented from being released again from the desulfurization apparatus, the purity of recovered gypsum can be increased and the usage of industrial water can be reduced.

BRIEF DESCRIPTION OF THE DRAWINGS

FIG. 6 is a schematic configuration diagram of a boiler plant for thermal power generation, which uses coal as fuel.

DETAILED DESCRIPTION OF THE INVENTION

Figure 1:
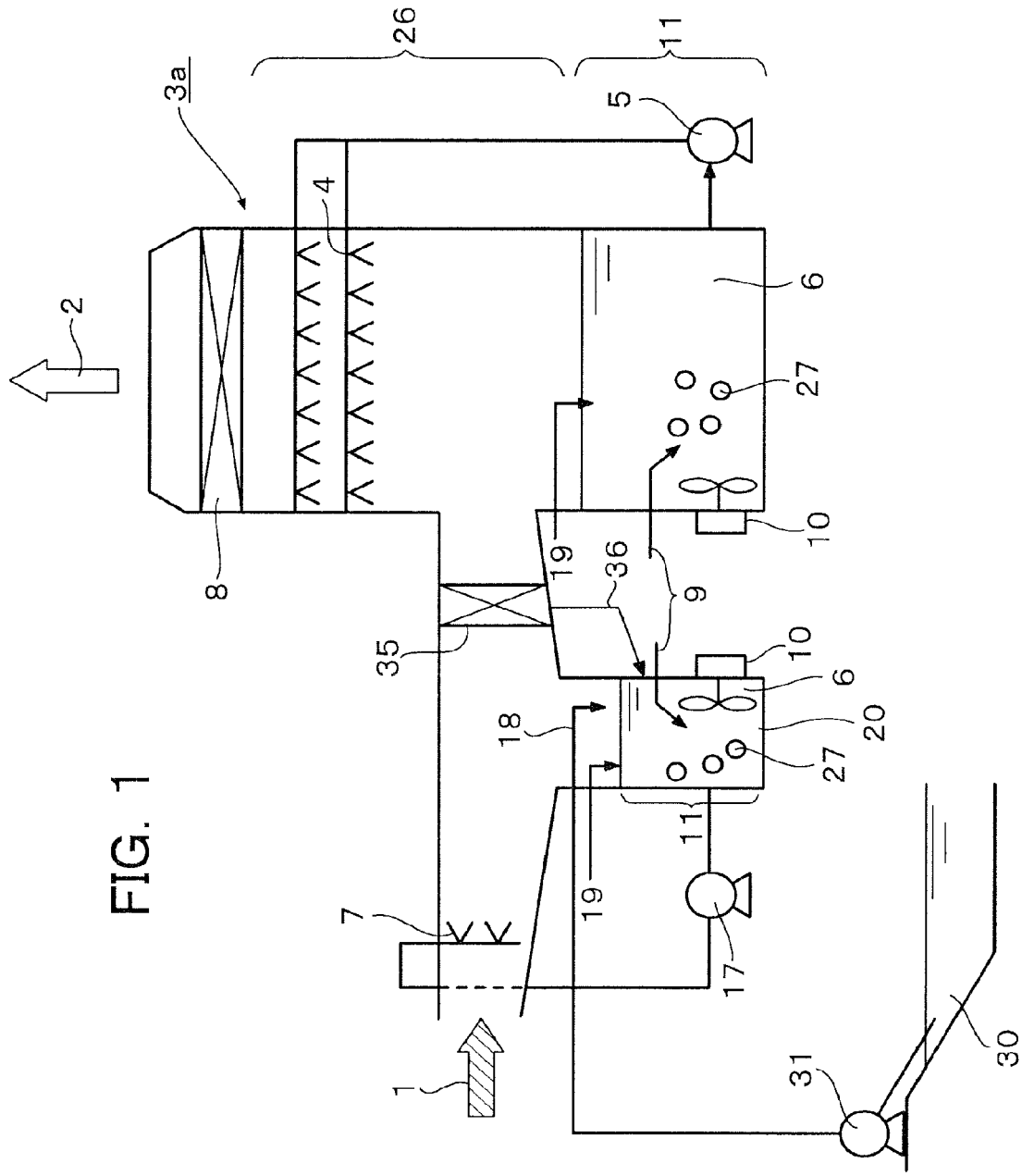
FIG. 1 is a schematic configuration diagram of a wet type flue-gas desulfurization apparatus according to a first embodiment of the invention.

Next, embodiments of the invention will be described with reference to the drawings. FIG. 1 is a schematic configuration diagram of a wet type flue-gas desulfurization apparatus according to a first embodiment of the invention.

As shown in FIG. 1, a desulfurization apparatus body 3a of the desulfurization apparatus is chiefly constituted by an absorbent spray nozzle 4 for spraying an absorbent 6, an absorbent circulation pump 5, the absorbent 6, a mist eliminator 8, an oxidation gas supply portion 9 and an agitator 10. A region designated by the numeral 11 serves as an absorbent reservoir portion, and a region designated by the numeral 26 serves as a desulfurization absorption portion.

An upstream absorbent spray nozzle 7, an absorbent circulation pump 17, an upstream circulation tank 20, an upstream mist eliminator 35, a seawater supply pump 31, etc. are placed on the upstream side of the desulfurization apparatus body 3a in the flow direction of exhaust gas.

The absorbent 6 composed of limestone slurry is reserved in the upstream circulation tank 20, to which seawater 30 is supplied as make-up water 18 by use of the seawater supply pump 31. The output of the absorbent 6 in the upstream circulation tank 20 is adjusted to make the Cl-ion concentration in the absorbent 6 in the upstream circulation tank 20 not lower than 50,000 ppm. The Cl-ion concentration in the seawater 30 is usually about 16,000 to 30,000 ppm.

The absorbent 6 whose Cl-ion concentration is adjusted to be not lower than 50,000 ppm is sent to the upstream absorbent spray nozzle 7 by the absorbent circulation pump 17, and sprayed from the upstream absorbent spray nozzle 7. Thus, exhaust gas 1 in the inlet of the desulfurization apparatus is brought into gas-liquid contact with the absorbent 6.

Since the exhaust gas 1 in the inlet of the desulfurization apparatus contains acid gas such as hydrogen chloride (HCl) or hydrogen fluoride (HF) or SOx such as $SO_2$, the pH value of the absorbent 6 is lowered by the aforementioned gas-liquid contact. Therefore, when the pH value of the absorbent 6 reaches a specified value (which is 2.0 to 6.5 in pH value in this embodiment) or lower, an alkaline agent 19 such as calcium carbonate is injected into the upstream circulation tank 20 to neutralize the absorbent 6.

Sulfurous acid generated due to the neutralization reaction is oxidized by contact with oxidation gas (oxidation air in this embodiment) 27 to generate gypsum. A part of the absorbent 6 containing gypsum is sent to a not-shown dehydrator and extracted as gypsum from the desulfurization apparatus 3.

The absorbent 6 other than the extracted absorbent 6 is circulated again by the absorbent circulation pump 17 and sprayed from the upstream absorbent spray nozzle 7 to the exhaust gas 1 in the inlet of the desulfurization apparatus again.

Metal mercury ($Hg^0$) in the exhaust gas 1 in the inlet of the desulfurization apparatus is oxidized by a denitration apparatus 14 (see FIG. 6) and supplied as divalent mercury ($Hg^{2+}$) to the upstream absorbent spray nozzle 7. The flow rate of the absorbent 6 required for absorbing the divalent mercury ($Hg^{2+}$) may be small to be not higher than about 1/10 of the flow rate of the absorbent 6 required for absorbing $SO_2$.

The divalent mercury ($Hg^{2+}$) in the exhaust gas 1 is absorbed by the absorbent 6 and then reserved in the absorbent reservoir portion 11 of the upstream circulation tank 20. Due to reaction with the generated gypsum, the divalent mercury ($Hg^{2+}$) is fixed in a form of mercury sulfate ($HgSO_4$) or the like.

Figure 3:
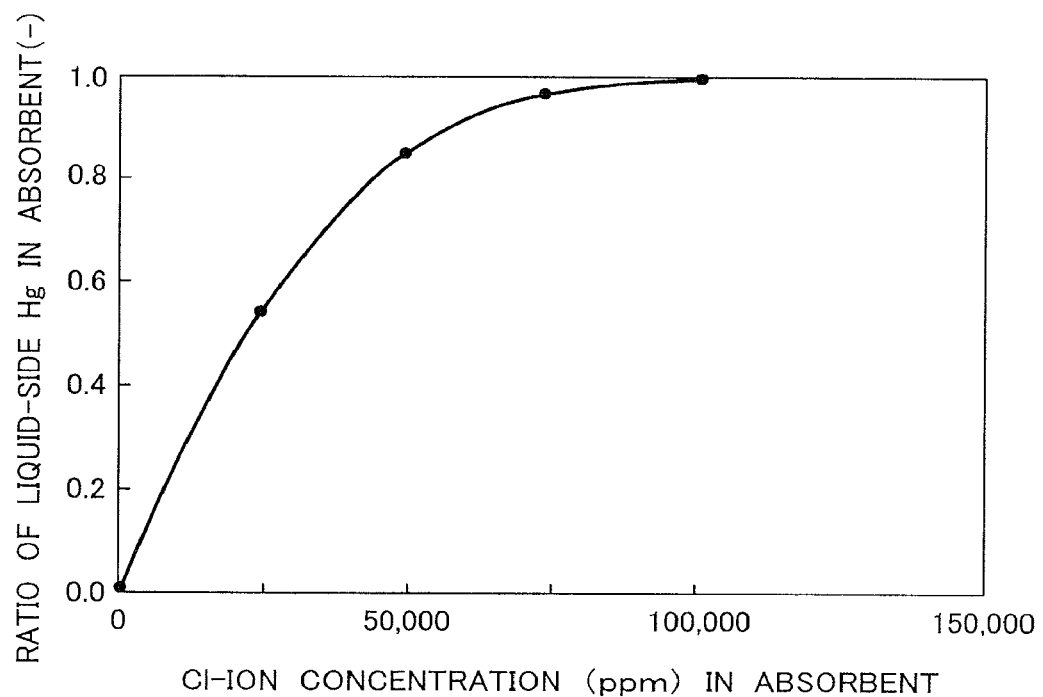
FIG. 3 is a characteristic chart showing the relation between the Cl-ion concentration in an absorbent reserved in an absorbent reservoir portion and the ratio of Hg in the absorbent.

FIG. 3 is a characteristic chart showing the relation between the Cl-ion concentration (abscissa) in the absorbent reserved in the absorbent reservoir portion 11 and the ratio of Hg (ordinate) in the absorbent.

As is apparent from FIG. 3, Hg becomes a higher-order chloro complex such as $HgCl_3^-$ or $HgCl_4^{2-}$ when the Cl-ion concentration in the absorbent increases to 50,000 to 100,000 ppm. Thus, the mercury ($Hg^{2+}$) concentration in the absorbent reservoir portion 11 becomes high. As a result, there is little metal mercury ($Hg^0$) in the gypsum generated in the upstream circulation tank 20. It is therefore possible to increase the purity of the recovered gypsum.

Figure 4:
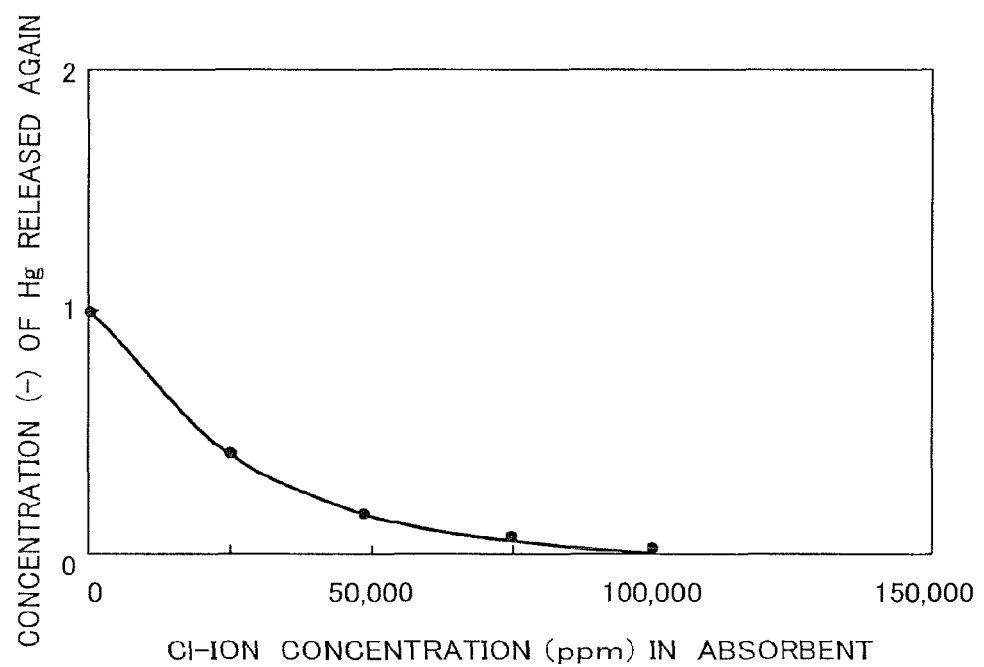
FIG. 4 is a characteristic chart showing the relation between the Cl-ion concentration in an absorbent reserved in an absorbent reservoir portion and the concentration of Hg released again.
Figure 5:
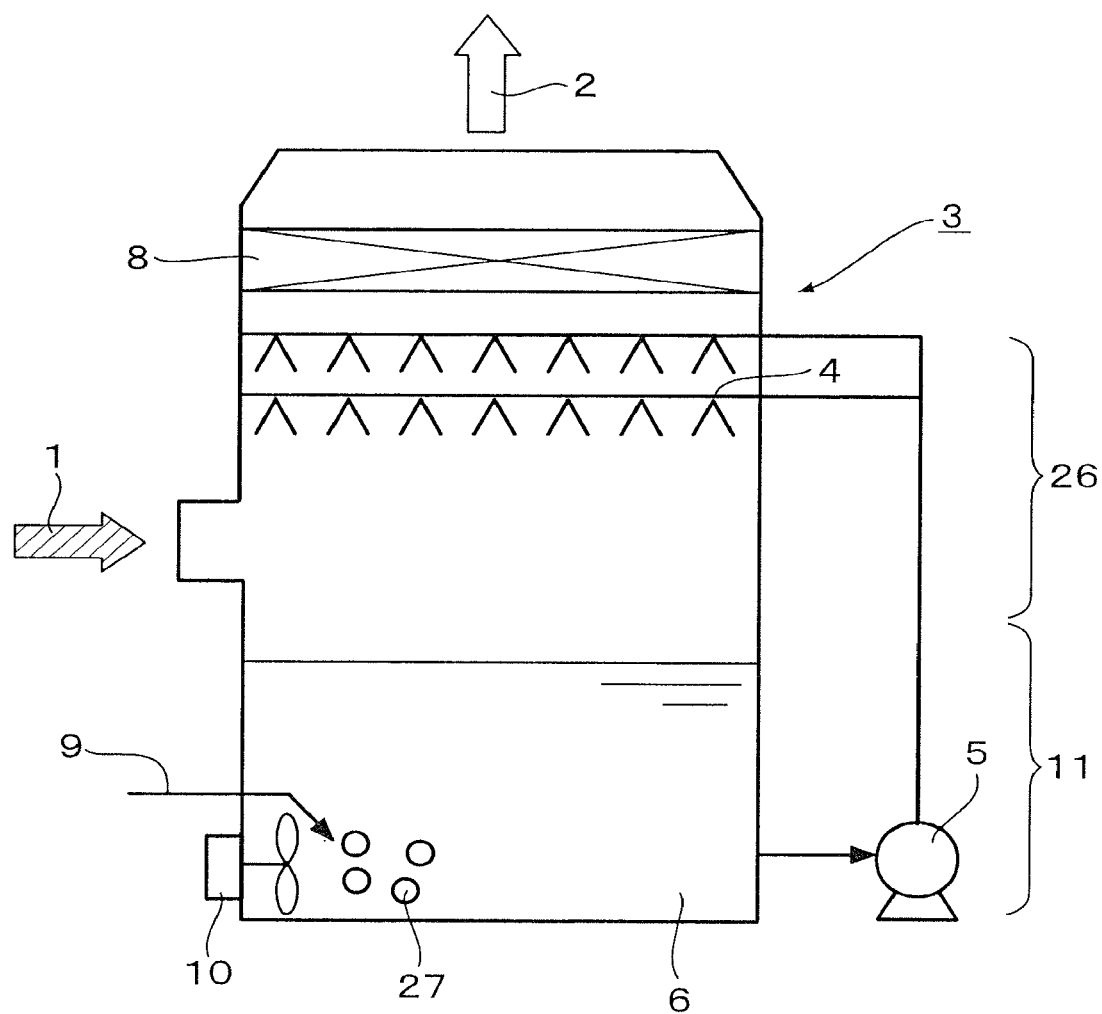
FIG. 5 is a schematic configuration diagram of a wet type flue-gas desulfurization apparatus according to the background art.

FIG. 4 is a characteristic chart showing the relation between the Cl-ion concentration (abscissa) in the absorbent reserved in the absorbent reservoir portion 11 and the concentration of Hg released again (ordinate).

As is apparent from FIG. 4, the concentration of Hg released again decreases when the Cl-ion concentration in the absorbent increases to 50,000 to 100,000 ppm. This is because the higher-order chloro complex generated as described previously stabilizes Hg in the absorbent so that Hg can be prevented from being released again.

In addition, it has been proved that the elimination efficiency of SOx such as $SO_2$ is lowered when the Cl-ion concentration in the absorbent 6 of the desulfurization apparatus 3 increases. Since the concentration (about 30 ppm) of Cl ions contained in the exhaust gas 1 in the inlet of the desulfurization apparatus can be eliminated by the upstream absorbent spray nozzle 7, the Cl-ion concentration in the absorbent 6 of the desulfurization apparatus 3 can be prevented from increasing. Thus, the elimination efficiency of SOx such as $SO_2$ in the desulfurization apparatus 3 can be increased.

Further, when the upstream mist eliminator 35 is placed, liquid carry-over from the upstream absorbent spray nozzle 7 are collected and collected liquid 36 thereof is returned to the upstream circulation tank 20. Thus, the carry-over liquid drops containing Cl ions with a high concentration are prevented from being introduced into the desulfurization apparatus body 3a.

As shown in FIG. 1, the seawater 30 is pumped up by the seawater supply pump 31 and supplied as make-up water to the upstream circulation tank 20. The absorbent 6 pumped up from the upstream circulation tank 20 is sprayed from the upstream absorbent spray nozzle 7.

The temperature of the exhaust gas in the inlet of the upstream absorbent spray nozzle 7 is 90 to 160° C. The absorbent 6 flowing in the upstream absorbent spray nozzle 7 reaches 50 to 55° C. Due to this temperature difference, the moisture of the absorbent 6 is evaporated at the time of gas-liquid contact between the exhaust gas and the absorbent while the exhaust gas is also cooled down to the temperature of 50 to 55° C. The cooled exhaust gas is supplied to the desulfurization apparatus 3. The absorbent temperature in the desulfurization apparatus 3 is also 50 to 55° C. Therefore, the moisture of the absorbent 6 is hardly evaporated in the desulfurization apparatus 3 because there is no difference between the gas and the absorbent.

For example, in the desulfurization apparatus 3 in which exhaust gas whose gas flow rate is 3,000,000 $m^3N/h$ and whose gas temperature is 135° C. is treated, the rate of evaporated water is about 140 t/h. The seawater 30 is supplied as the make-up water 18 to the upstream circulation tank 20 so that industrial water required for making up for the evaporated water can be saved correspondingly.

Figure 2:
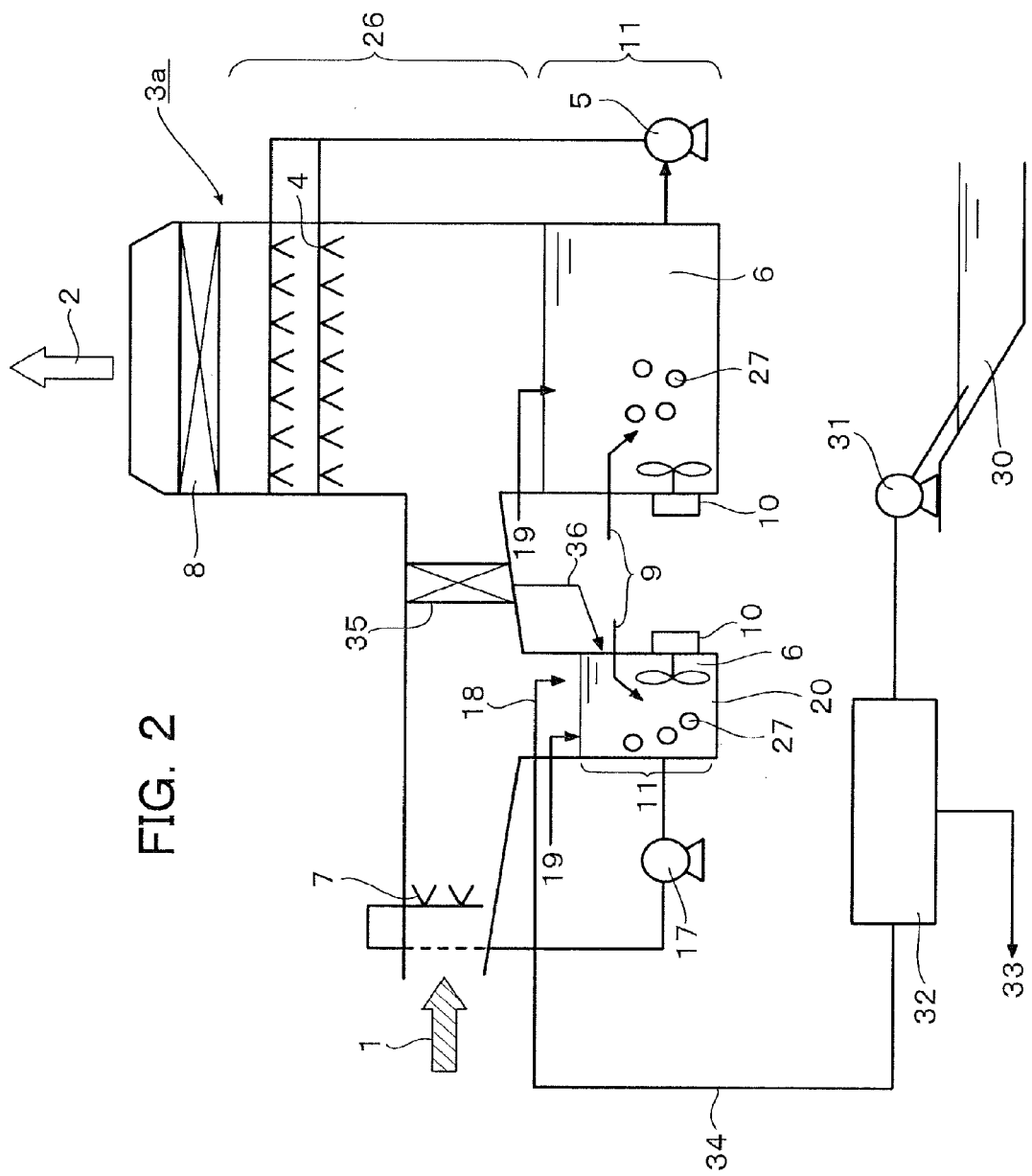
FIG. 2 is a schematic configuration diagram of a wet type flue-gas desulfurization apparatus according to a second embodiment of the invention.

FIG. 2 is a schematic configuration diagram of a wet type flue-gas desulfurization apparatus according to a second embodiment of the invention. This embodiment is different from the aforementioned first embodiment in that a desalination apparatus (concentrated water manufacturing apparatus) 32 is placed on a system between the seawater supply pump 31 and the upstream circulation tank 20.

For example, a multi-stage flash method, a membrane separation method, etc. can be used as the desalination method for the desalination apparatus 32. In any method, fresh water 33 with a low Cl-ion concentration and concentrated liquid 34 containing Cl ions with a high concentration of 50,000 to 60,000 ppm can be obtained from the desalination apparatus 32.

The Cl-ion concentrated liquid 34 is supplied as the make-up water 18 to the upstream circulation tank 20. The absorbent 6 in the upstream circulation tank 20 is sprayed from the upstream absorbent spray nozzle 7 to the exhaust gas 1 in the inlet of the desulfurization apparatus. Thus, the Cl-ion concentrated liquid 34 is used in the same manner as the seawater 30 in the first embodiment so that Hg can be prevented from being released again, the purity of gypsum can be increased and the usage of industrial water can be reduced.

The aforementioned fresh water 33 can be used for another application, for example, as rinse water for gypsum in a not-shown gypsum dehydration process.

According to the invention, the upstream absorbent spray nozzle 7 and the upstream circulation tank 20 are provided on the upstream side of the desulfurization apparatus body 3a in the flow direction of exhaust gas, and the make-up water 18 is supplied to the upstream circulation tank 20. Thus, the absorbent 6 whose Cl-ion concentration is not lower than 50,000 ppm can be sprayed to the exhaust gas 1 in the inlet of the desulfurization apparatus.

It is therefore possible to prevent Hg from being released again from the desulfurization apparatus and to increase the purity of gypsum recovered from the desulfurization apparatus.

In addition, the seawater 30 or the Cl-ion concentrated liquid 34 obtained from the desalination apparatus 32 can be used as the make-up water 18 of the upstream circulation tank 20. It is therefore possible to prevent the absorbent 6 from being evaporated in the desulfurization apparatus and to reduce the usage of industrial water.

Further, the Cl-ion concentration in the absorbent of the desulfurization apparatus can be prevented from increasing. It is therefore possible to obtain such an effect that lowering in desulfurization performance can be suppressed.

In this embodiment, limestone is used as an absorbent of SOx, but lime may be used as an absorbent of SOx.

An example in which the wet type flue-gas desulfurization apparatus is applied to a thermal power plant has been shown in this embodiment. However, the wet type flue-gas desulfurization apparatus according to the invention may be also applied to any combustion equipment in other technical fields such as various factories, steel mills, chemical plants, etc.

What is claimed is:

1. A wet type flue-gas desulfurization method for desulfurizing by using a wet type flue-gas desulfurization apparatus comprising:

an apparatus body side absorption tower which has an apparatus body side circulation tank in a lower portion thereof, the apparatus body side circulation tank reserving absorbent slurry;

an apparatus body side absorbent spray nozzle which is placed inside the apparatus body side absorption tower to spray the absorbent slurry;

an oxidation gas supply portion which supplies oxidation gas to the absorbent slurry reserved in the apparatus body side circulation tank; and a desulfurization apparatus body which includes the apparatus body side absorption tower, the apparatus body side absorbent spray nozzle and the oxidation gas supply portion, and in which gas to be treated, containing sulfur compounds, is introduced into the apparatus body side absorption tower and brought into gas-liquid contact with the absorbent slurry sprayed from the apparatus body side absorbent spray nozzle, so that the sulfur compounds in the gas to be treated can be absorbed by the absorbent slurry; wherein:

the gas to be treated contains mercury;

the desulfurization apparatus is provided with, on an upstream side of the desulfurization apparatus body in a flow direction of the gas to be treated:

an upstream absorption tower which includes an upstream circulation tank reserving absorbent slurry;

an upstream absorbent spray nozzle which is placed inside the upstream absorption tower to spray the absorbent slurry; and a make-up water supply unit which supplies make-up water into the upstream circulation tank, the method comprising the acts of:

keeping a chloride ion concentration of the absorbent slurry in the upstream circulation tank not lower than 50,000 ppm by a process in which the make-up water supply unit supplies make-up water into the upstream circulation tank;

collecting liquid by an upstream mist eliminator provided between the upstream absorbent spray nozzle and the desulfurization apparatus body; and returning the collected liquid obtained by the upstream mist eliminator to the upstream absorption tower.

2. A wet type flue-gas desulfurization method according to claim 1, wherein:

the make-up water is seawater.

3. A wet type flue-gas desulfurization method according to claim 1, wherein:

the make-up water is chloride-ion concentrated water obtained by a concentrated water manufacturing apparatus.

4. A wet type flue-gas desulfurization method according to claim 3, wherein:

the concentrated water manufacturing apparatus is a desalination apparatus which obtains water from seawater so that the water obtained by the desalination apparatus is used as rinse water for gypsum obtained by reaction between the gas to be treated and the absorbent.

* * * * *